L. ROBINSON.
Wheel Cultivator.
No. 15,819.  Patented Sept. 30, 1856.
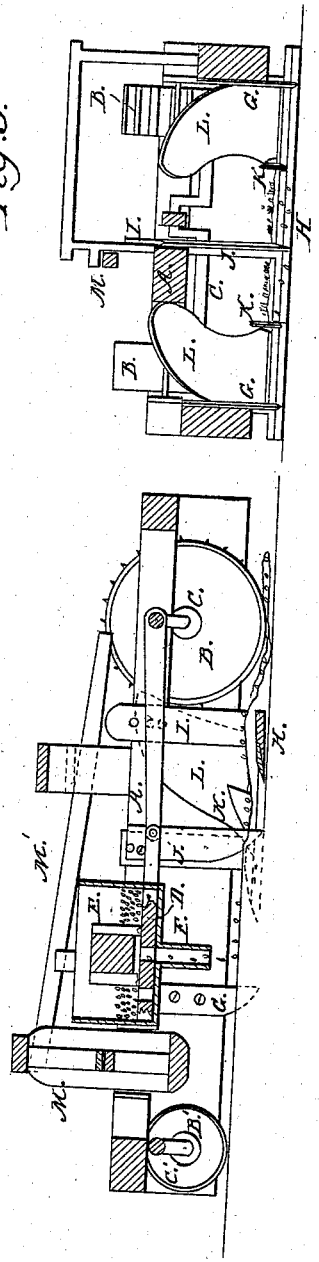
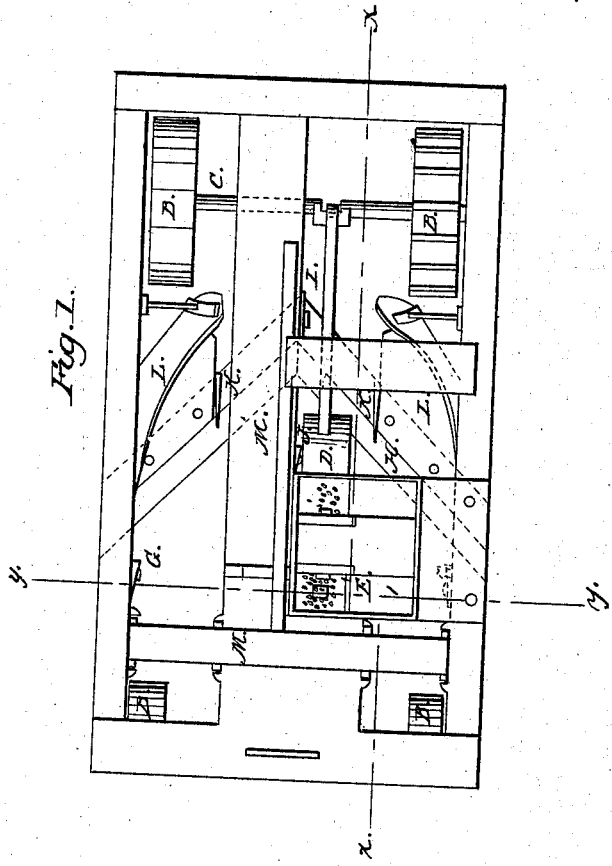

UNITED STATES PATENT OFFICE.

L. ROBINSON, OF WEST CAMBRIDGE, MASSACHUSETTS.

IMPROVEMENT IN CULTIVATORS.

Specification forming part of Letters Patent No. 15,819, dated September 30, 1856.

*To all whom it may concern:*

Be it known that I, LUTHER ROBINSON, of West Cambridge, in the county of Middlesex and State of Massachusetts, have invented a new and useful Prairie Plow and Cultivator; and I do hereby declare that the following is a full, clear, and exact description of the same, reference being had to the accompanying drawings, forming part of this specification, in which—

Figure 1 is a plan; Fig. 2, a vertical longitudinal section in the line $x$, Fig. 1; and Fig. 3, a transverse section, through the line $y\ y$ in Fig. 1, of a prairie plow and cultivator constructed after my invention.

Similar letters of reference in the several figures indicate like parts.

The nature of my invention consists in the arrangement and combination of the several sets of cutters, mold-boards, and seed-dropper, as presently described, whereby the seed is first dropped upon the undisturbed tough sod. Said sod instantaneously thereafter is cut free both horizontally and vertically the full width of the machine, and then so divided on either side of its center that the portion on the right side comes upon the right mold-board and that on the left side upon the left mold-board, and are inverted thereby in such a manner that the upper or sod surface of the same comes opposite the upper or sod surface of the central portion, and the seed thus brought between the two sod-surfaces and covered perfectly, and the soil about it enriched by the grass speedily decaying while in this condition and becoming part of the same.

To enable others skilled in the art to make and use my invention, I will proceed to describe its construction and operation.

A represents a strong oblong frame mounted upon wheels B B B' B'. One or both wheels B B are made fast upon an axle, C, so as to revolve with it, and those, B' B', are left loose on an axle, C', so as to revolve free of it.

D is an ordinary seed slide or dropper, working under a hopper, E, which is arranged on top of the frame, near the center of its width, being moved back and forth by a crank on the axle C, or otherwise.

F is a tube set under the slide so as to deposit the seed in a line with the center of the width of the machine, as shown.

G G are two vertical cutters attached to the side bars of the frame. They serve for freeing the sod at its sides or edges.

H is a bevel-cutter, arranged on the bottom of the side bars in nearly a horizontal position, or with its cutting-edge a little lower than its back edge, so as to enter the soil more readily. This cutter, which is for freeing the sod underneath, is formed of two blades, which are united at the center of the machine and run diagonally therefrom to the side bars, as shown. By thus forming this cutter it meets with less resistance in entering the soil.

I is a standard for supporting the cutter at the center, and J is a vertical blade arranged in front of and in line with the standard, and serving for opening the sod, and thus forming a passage for the standard and relieving it from resistance. This cutter also, by dividing the sod, eases its passage over the cutter H, and thus lessens the labor of the team.

K K are two vertical cutters, starting up from the top of the horizontal cutter H. One of these cutters is placed about midway of the length of the left blade of the cutter H, and the other about midway of the length of the right blade of said cutter, as shown. It is by thus arranging these blades that one quarter of the sod cut by the cutters G G H is cut off on the left side and another quarter on the right side of the center.

L L are two mold-boards situated behind the cutters K K, one being attached to the right blade of horizontal cutter H and the other to the left blade of the same. These mold-boards serve for receiving the parts of the sod which are cut off by the cutters K K, and throwing them, inverted, upon the central portion, as illustrated in Figs. 2 and 3, in such a manner as to perfectly cover the seed which is dropped by the slide upon the central portion, and also bring their sod-surfaces opposite the sod-surface of the central portion, and thus enrich the soil about the seed with the grass, which, owing to being in this condition, soon decays, mixes with the same, and acts as a fertilizing agent.

M is a device for raising the frame, cutters,

&c., above the ground when it is desired not to operate upon the same. M' is a lever by which it is operated. Instead of this arrangement, any of the well-known devices for effecting this object may be employed.

Operation: As the machine moves forward in the condition shown in Figs. 2 and 3 the cutters G G cut or free the sod along its edges ready for H, which passes under it and cuts and lifts it up thereby and causes it to come in contact with the cutters J K K, and to be divided into four equal parts, which escape at the rear of the machine, as follows: one-half of the central portion remaining undisturbed, other than being loosened underneath from being cut up, lifted, and allowed to fall a short distance, while the other half, one-quarter of which is on the right and the other quarter on the left of the central portion, comes upon the mold-boards, is inverted, and thrown thereby so as to fall upon the central portion and form a hill and cover the seed, as illustrated in Fig. 3.

This machine is very simple, compact, and durable, and is very utile, as it pares the whole surface of the land, and yet inverts but half of it, and thus saves labor and also much expense for fertilizing agents.

What I claim as my invention, and desire to secure by Letters Patent, is—

The arrangement consisting of the vertical cutters G G J K K, horizontal cutter H, mold-boards L L, and seed-dropper D, said parts being placed in the relation to each other shown, substantially as and for the purpose herein set forth.

LUTHER ROBINSON.

Witnesses:
 T. J. RUSSELL,
 T. H. RUSSELL.